US009066030B2

(12) United States Patent
Kim

(10) Patent No.: US 9,066,030 B2
(45) Date of Patent: Jun. 23, 2015

(54) IMAGE SENSORS WITH COLUMN FAILURE CORRECTION CIRCUITRY

(71) Applicant: Semiconductor Components Industries, LLC, Phoenix, AZ (US)

(72) Inventor: Dongsoo Kim, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 116 days.

(21) Appl. No.: 13/852,524

(22) Filed: Mar. 28, 2013

(65) Prior Publication Data

US 2014/0078364 A1    Mar. 20, 2014

Related U.S. Application Data

(60) Provisional application No. 61/703,224, filed on Sep. 19, 2012.

(51) Int. Cl.
*H04N 5/335*   (2011.01)
*H04N 5/378*   (2011.01)

(52) U.S. Cl.
CPC .............. *H04N 5/335* (2013.01); *H04N 5/378* (2013.01)

(58) Field of Classification Search
CPC ... H04N 5/374; H04N 5/3741; H04N 5/3742; H04N 5/376; H04N 5/378
USPC ......................................... 348/294, 302, 308
See application file for complete search history.

(56) References Cited

U.S. PATENT DOCUMENTS

| 5,694,495 | A  | * | 12/1997 | Hara et al. | 382/324 |
|---|---|---|---|---|---|
| 7,796,172 | B1 | * | 9/2010 | Slagle et al. | 348/294 |
| 8,134,619 | B2 | * | 3/2012 | Tonkikh | 348/294 |
| 2002/0041198 | A1 | * | 4/2002 | Parris et al. | 327/408 |
| 2003/0058137 | A1 | * | 3/2003 | Tsai | 341/1 |
| 2006/0125940 | A1 | * | 6/2006 | Tinkler et al. | 348/294 |
| 2006/0231732 | A1 | * | 10/2006 | Yan | 250/208.1 |
| 2006/0268137 | A1 | * | 11/2006 | Myers | 348/294 |
| 2009/0108177 | A1 | * | 4/2009 | Chou | 250/214 C |
| 2010/0182473 | A1 | * | 7/2010 | Nakamura | 348/308 |
| 2012/0062772 | A1 | * | 3/2012 | Osawa et al. | 348/300 |
| 2012/0249842 | A1 | * | 10/2012 | Kim | 348/241 |
| 2012/0287719 | A1 | * | 11/2012 | Mun et al. | 365/185.18 |
| 2014/0247382 | A1 | * | 9/2014 | Moldovan et al. | 348/311 |

OTHER PUBLICATIONS

Yu, A.J. et al. "Defect-tolerant FPGA switch block and connection block with fine-grain redundancy for yield enhancement," Field Programmable Logic and Applications, 2005. International Conference on , pp. 255-262, Aug. 24-26, 2005.*

* cited by examiner

*Primary Examiner* — Timothy J Henn
(74) *Attorney, Agent, or Firm* — Treyz Law Group; Jason Tsai

(57) ABSTRACT

Electronic devices may include image sensors having image pixel arrays with image pixels arranged in pixel rows and pixel columns. Each pixel column may be coupled to column readout circuitry through column randomizing circuitry. The column readout circuitry may include a column circuit associated with each pixel column and at least one reserve column circuit. The column randomizing circuitry may randomize the distribution of image signals from the pixel columns to the column readout circuitry. The column randomizing circuitry may distribute the randomized image signals from at least one of the pixel columns to a reserve column circuit when any of the column circuits associated with the pixel columns has failed. The column randomizing circuitry may include an output column line for each column circuit and first and second transistors coupled in parallel to each output column line.

20 Claims, 4 Drawing Sheets

IMAGE SENSORS WITH COLUMN FAILURE CORRECTION CIRCUITRY

This application claims the benefit of provisional patent application No. 61/703,224, filed Sep. 19, 2012, which is hereby incorporated by reference herein in its entirety.

BACKGROUND

This relates generally to imaging devices, and more particularly, to imaging devices with column circuitry.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels and supplying bias signals to the image pixels.

Each column of image pixels in the array of image pixels is typically coupled to column readout circuitry for that pixel column. Because the column readout circuitry for each column handles signal readout for many pixels, failure of a particular column readout circuit can result in an unusable image sensor, thereby reducing the percentage yield of viable image sensors in situations in which image sensors are being produced in large numbers.

It would therefore be desirable to be able to provide imaging devices with improved column circuitry.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements. The image pixels may be arranged in pixel rows and pixel columns.

The readout circuitry may include column randomizing circuitry and column readout circuitry. The column readout circuitry may include a column readout circuit associated with each column of image pixels. The column readout circuitry may include additional reserve column readout circuits. The column randomizing circuitry may redistribute pixel signals to one or more reserve column readout circuits when one or more column readout circuits associated with one or more pixel columns fails.

In some situations, image signals from a pixel array can exhibit noise such as fixed pattern noise related to the operation of current mirror circuits on one or more pixel columns. The column randomizing circuitry may randomize the image signals from the pixels columns whether or not any column readout circuits have failed.

Figure 1:
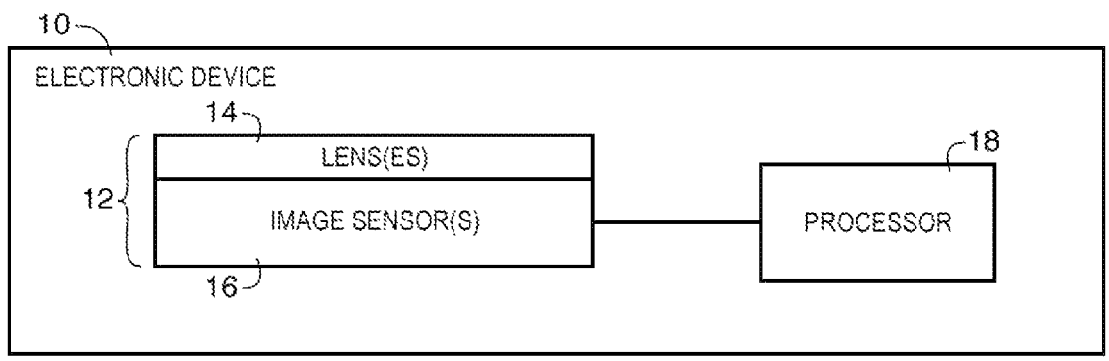
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 provides corresponding digital image data to processing circuitry such as processor 18. If desired, camera module 12 may be provided with an array of lenses 14 and an array of corresponding image sensors 16.

Processing circuitry such as processor 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
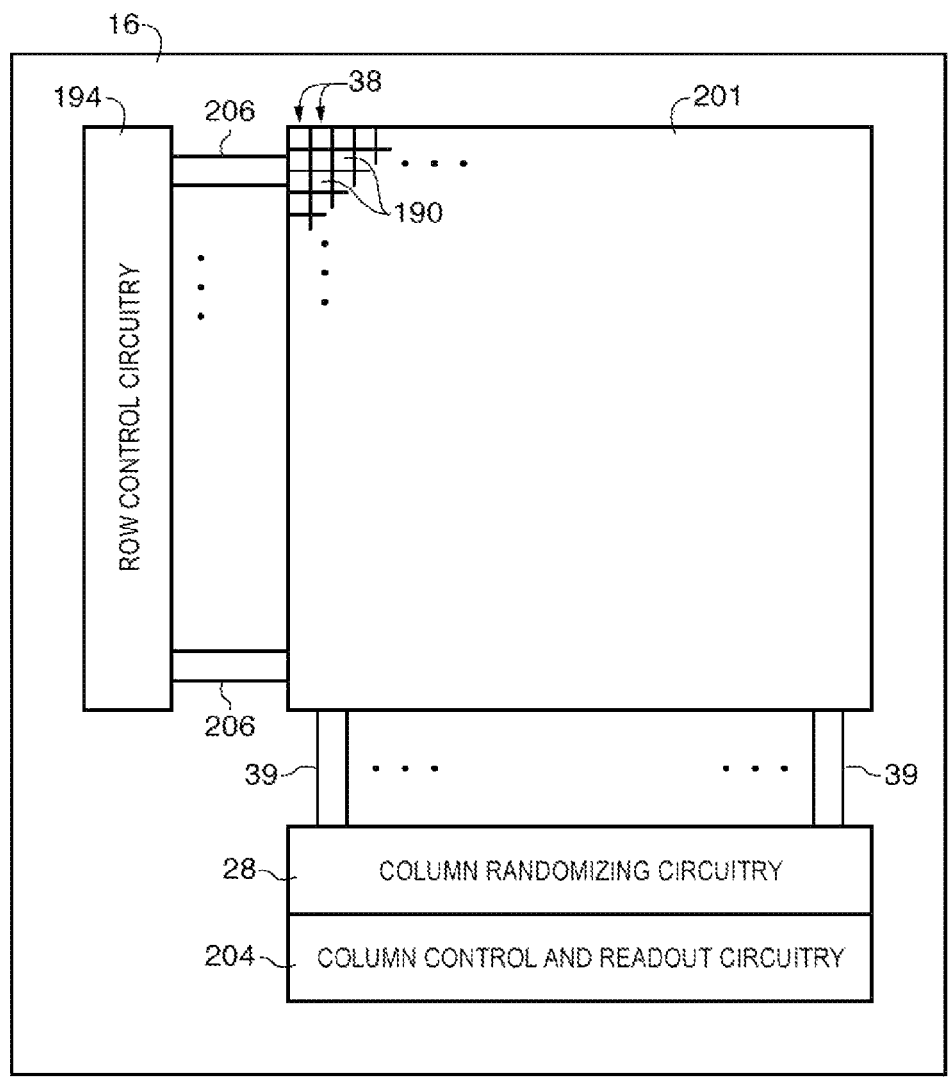
FIG. 2 is a diagram of an illustrative pixel array and associated control circuitry for generating control signals and bias signals and reading out image data in an image sensor in accordance with an embodiment of the present invention.

As shown in FIG. 2, image sensor 16 may include a pixel array 201 containing image sensor pixels 190, row control circuitry such as row control circuitry 194 and column circuitry such as column control and readout circuitry 204. Array 201 may contain, for example, hundreds or thousands of rows of image sensor pixels 190 and hundreds or thousands of columns 38 of image sensors pixels 190. Row control circuitry 194 may be used to supply control signals such as reset, transfer, and read control signals to pixels 190 over control paths 206. One or more conductive lines such as column lines 39 may be coupled to each pixel column 38 in array 201. Column lines 39 may be used for reading out image signals from pixels 190 and for supplying bias signals (e.g., bias currents or bias voltages) to pixels 190. During pixel readout operations, a pixel row in array 201 may be selected by row control circuitry 194 and image data associated with image pixels 190 in that pixel row can be read out along column lines 39.

Image signals from each pixel column 38 may be received by column randomizing circuitry 28. Column randomizing circuitry 28 may distribute the pixel signals from each pixel column 38 to column circuits in column control and readout circuitry 204. In order to reduce fixed pattern noise in output image data, column randomizing circuitry 28 may randomize the distribution of image signals from each pixel column 38 to various column circuits in circuitry 204.

In situations in which one or more column readout circuits in circuitry 204 fails, column randomizing circuitry 28 may use one or more reserve column circuits in circuitry 204 for reading out image pixel signals.

Column circuitry 204 may include sample-and-hold circuitry, amplifier circuitry, analog-to-digital conversion circuitry, bias circuitry such as pixel column bias supply circuits (e.g., circuitry such as current mirror circuitry for providing bias currents to source follower transistors of pixels 190 along a pixel column), memory or other circuitry for operating pixels 190 and for reading out image signals from columns 38 of pixels 190. Column circuitry 204 may include programmable memory for storing flag bits such as flag values that indicate failed pixel columns.

Readout circuitry associated with column control and readout circuitry 204 (e.g., sample-and-hold circuitry and analog-to-digital conversion circuitry) may be used to supply digital image data to processor 18 (FIG. 1).

Image pixels 190 may be complementary metal-oxide-semiconductor (CMOS) image pixels, charge-coupled-device (CCD) image pixels or may employ other types of imaging circuitry. As an example, CMOS image pixels may include a photosensitive element such as a photodiode, a positive power supply terminal, a ground power terminal, and transistors such as reset transistors, source follower transistors, transfer transistors, etc. Incoming light may be collected by a photosensitive element such as photodiode after passing through a color filter structure. Charges generated on the photodiode in response to the incoming light may be transferred to a charge storage region such as a floating diffusion region implemented using a region of doped semiconductor (e.g., a doped silicon region formed in a silicon substrate by ion implantation, impurity diffusion, or other doping techniques). An image signal associated with the stored charge on can be conveyed along a column line to column control and readout circuitry 204 through column randomizing circuitry 28.

Figure 3:
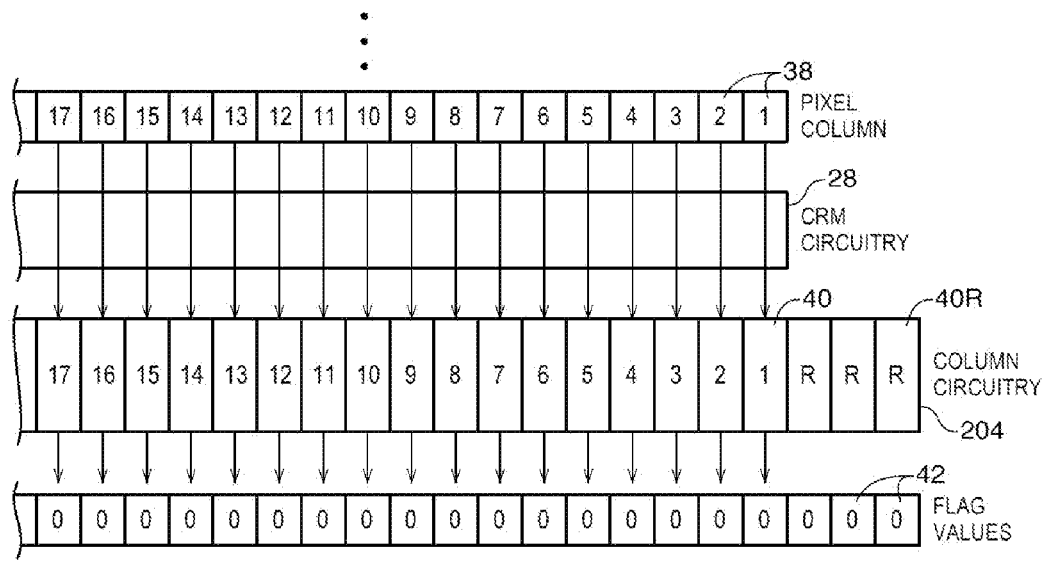
FIG. 3 is a diagram showing how column randomizing circuitry may be used to distribute image signals from image pixel columns to column readout circuitry having reserve column readout circuits when all column readout circuits are operational in accordance with an embodiment of the present invention.

FIG. 3 is a diagram showing how, in a simple case in which no column circuits have failed (i.e., all column circuits in column circuitry 204 are operational). Column circuitry 204 may include column circuits 40 associated with each pixel column 38. Column circuitry 204 may include additional column circuits such as reserve column circuits 40R. Reserve column circuits 40R may be used for reading out image data from pixel columns 38 when one or more of column circuits 40 fails.

Image pixel array 201 (see FIG. 2) may include a number N pixel columns 38. Column circuitry 204 may include the same number N column circuits 40 and an additional number M of reserve column circuits 40R. As examples, circuitry 204 may include one reserve column circuit 40R, two reserve column circuits 40R, three reserve column circuits 40R, more than three reserve column circuits 40R, four or more reserve column circuits 40R, ten or more reserve column circuits 40R, or 100 or more reserve column circuits 40R.

Each column circuit 40 and each reserve column circuit 40R may include sample-and-hold circuitry, amplifier circuitry, analog-to-digital conversion circuitry, bias circuitry such as pixel column bias supply circuits (e.g., circuitry such as current mirror circuitry for providing bias currents to source follower transistors of pixels 190 along a pixel column), memory or other circuitry for operating pixels 190 and for reading out image signals from columns 38 of pixels 190.

Column circuitry 204 may be used to store flag values such as flag values 42 for each pixel column 38. Flag values 42 may indicate whether a column circuit 40 has failed. Flag values such as flag values 42 may also be set to indicate a particular one of a group of column circuits such as an edge column circuit in a group of column circuits used for reading out a particular pixel column 38. For example, a flag value equal to zero may indicate that a column circuit is operational and a flag value equal to one may indicate that a column circuit has failed and/or that a column circuit is an edge circuit of a group of column circuits used for reading out a particular pixel column 38.

In the example of FIG. 3, no column circuits 40 have failed. All flag values 42 are therefore set to zero. In the simple example of FIG. 3, column randomizing circuitry 28 (sometimes referred to herein as column randomized modulation (CRM) circuitry) conveys an image signal from each pixel column to a directly associated column circuit 40. As examples, image signals from pixel column 1, 2, 3, 4, etc. are respectively delivered to column circuits 1, 2, 3, 4, etc.

Figure 4:
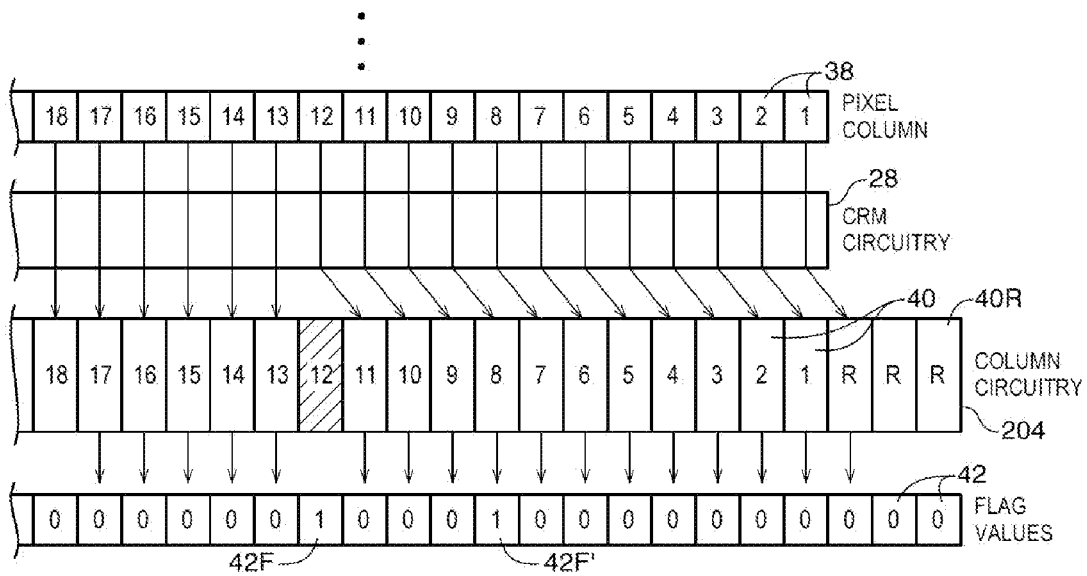
FIG. 4 is a diagram showing how column randomizing circuitry may be used to distribute image signals from image pixel columns to column readout circuitry having reserve column readout circuits when one or more column readout circuits fails in accordance with an embodiment of the present invention.

FIG. 4 is a diagram showing how column randomizing circuitry 28 may redistribute image signals from some pixel columns 38 when one or more column circuits 40 fails. As shown in FIG. 4, a column circuit such as the 12th column circuit may fail. Flag value 42 associated with the column circuit may be set to a failure flag value 42F. Failure flag value 42F may indicate to CRM circuitry 28 that image signals should be distributed to column circuits 40 other than 12th column circuit (for which failure flag 42F is set to one) and to one of reserve column circuits 40R. Additional failure flags such as failure flag 42F' may be set to one in order to indicate the edges of sets of column circuits to be used in randomizing image signals from a given set of pixel columns. In the simplified example of FIG. 4, CRM circuitry 28 shifts image signals from pixel columns 38 with column numbers equal to or less than the column number of the failed column to adjacent column circuits. In this example, pixel signals from the first pixel column are redirected to one of reserve column circuits 40R.

Figure 5:
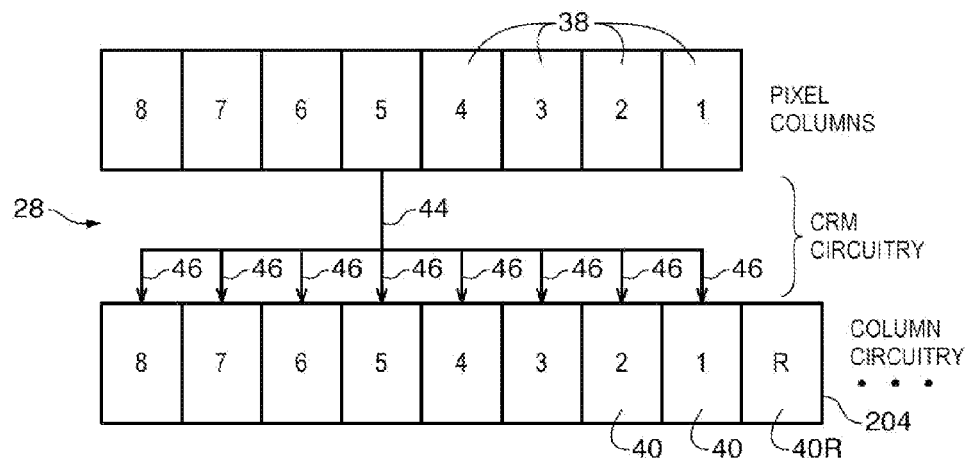
FIG. 5 is a diagram showing how column randomizing circuitry may be used to randomize the distribution of image signals from image pixel columns to column readout circuitry having reserve column readout circuits when all column readout circuits are operational in accordance with an embodiment of the present invention.

As shown in FIG. 5, even in situations in which no column circuits 40 have failed, CRM circuitry 28 may redistribute pixel signals from a given pixel column 38 to various column circuits 40 to reduce fixed pattern noise in images. In the example of FIG. 5, image signals from pixel column 5 can be readout from pixels in pixel column 5 (as indicated by line 44) through any of column circuits 1, 2, 3, 4, 5, 6, 7, or 8 (as indicated by arrows 46). CRM circuitry 28 may cycle through column circuits 1-8 randomly or in order so that image signals from image pixels in pixel column 5 and in different pixel rows are read out using different column circuits. In this way, if one of column circuits 40 is noisier than other column circuits 40, that noise is distributed throughout an image rather than concentrated in a column in the image. Pixel signals from any pixel column 38 may be randomized as shown in FIG. 5.

The example of FIG. 5 in which eight column circuits are used to readout image signals from a given pixel column is merely illustrative. If desired, more than eight column circuits or less than eight column circuits can be used to read out image signals from image pixels in each pixel column.

Figure 6:
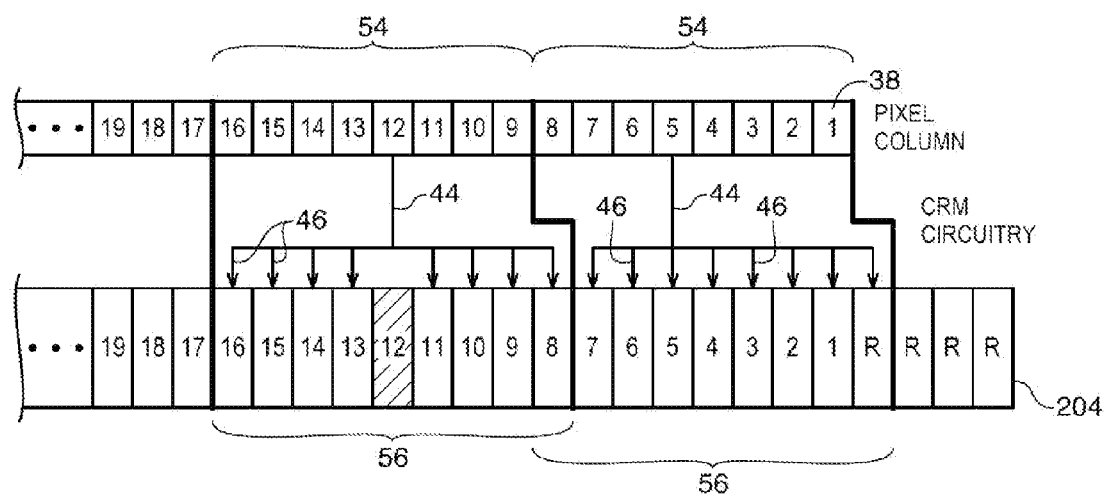
FIG. 6 is a diagram showing how column randomizing circuitry may be used to randomize the distribution of image signals from image pixel columns to column readout circuitry having reserve column readout circuits when one or more column readout circuits fails in accordance with an embodiment of the present invention.

FIG. 6 is a diagram showing how column randomizing circuitry 28 may redistribute and randomize image signals from pixel columns 38 when one or more column circuits 40 fails. In the example of FIG. 6, the 12th column circuit has failed. Each set 54 of pixel columns 38 (e.g., each set of eight pixel columns) has an associated set 56 of column circuits 40 (e.g., a set of nine column circuits). Each set 56 of column circuits may contain more column circuits 40 than the associated set 54 of pixel columns contains pixel columns. Adjacent sets 56 of column circuits 38 may partially overlap. When one or more column circuits 40 fails, a column circuit (e.g., column circuit 8) that belongs to two overlapping sets 56 of column circuits may be reassigned from its original set 56 to a neighboring set 56. When one or more column circuits 40 fails, one or more reserve column circuits 40R may be added to one of sets 56. In this way, each set 54 of pixel columns may be configured to provide image signals along paths 44 and one of paths 46 to a number of column circuits that is at least equal to the number of pixels columns in that set, even when one or more column circuits has failed.

Flag bits indicating failed columns (and indicating that reserve column circuits should be used) can be set during manufacturing and testing operations for each image sensor or can be set during normal operations of an image sensor. For example, during manufacturing operations for device 10, a sample image may be captured and read out using CRM circuitry 28 and column circuitry 204. In response to detecting one or more failed column circuits, flag bits may be set and stored in column circuitry 204 that cause CRM circuitry 28 to redistribute image signals around the failed column circuit as shown in, for example, FIG. 6. Alternatively, during normal operations of image sensor 16, a row of dummy pixels (e.g., a first row of pixels with pixels in each pixel column 38) can be used to captured and read out image data using CRM circuitry 28 and column circuitry 204. In response to detecting one or more failed column circuits using the image signals from the dummy pixels, flag bits may be set and stored in column circuitry 204 that cause CRM circuitry 28 to redistribute image signals around the failed column circuit as shown in, for example, FIG. 6.

Figure 7:
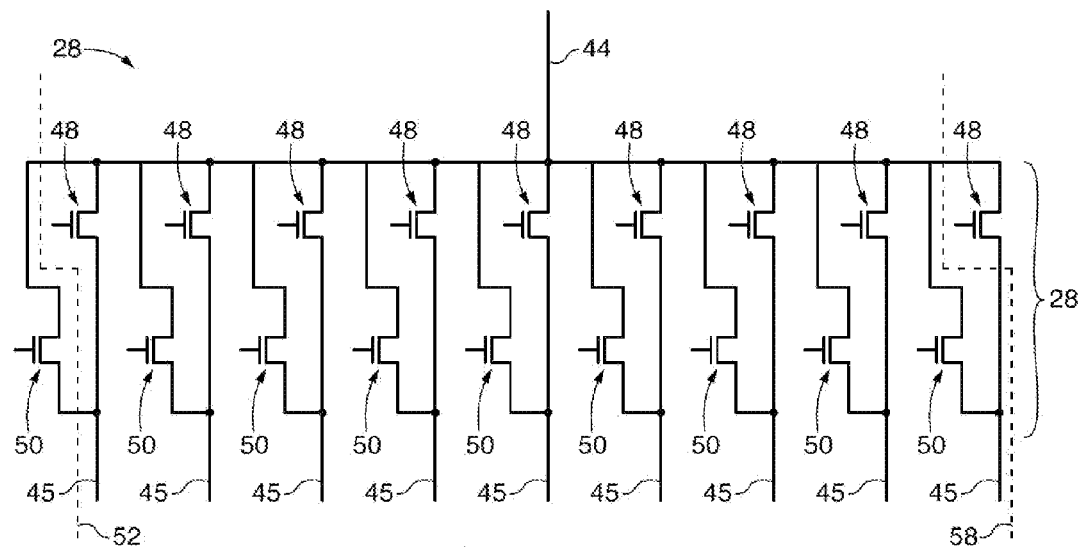
FIG. 7 is a diagram of illustrative column randomizing circuitry for distributing image signals from pixel columns to column circuitry with reserve column readout circuits in accordance with an embodiment of the present invention.

FIG. 7 shows an exemplary arrangement for a portion of column randomizing circuitry 28. As shown in FIG. 7, CRM circuitry 28 may include a first set of transistors 48 and second set of transistors 50. Each transistor 48 may be connected in parallel with one of transistors 50. As indicated by dashed lines 58, an image signal path 44 (e.g., one of column lines 39 of FIG. 1) may be configured to supply image signal data from a given pixel column 38 to any of nine output column lines 45. For example, a set of eight pixel columns 38 may supply image signals through a selected eight of the nine output column lines 45 in FIG. 7. If no column circuits have failed (i.e., if all column circuits in circuitry 204 are operational), flag bits may be set so that transistors 48 of eight output lines 45 are selectively used to readout image pixel data. In situations in which one or more column circuits has failed, one or more of transistors 50 may be selectively enabled so that the image signals from pixel columns 38 are shifted (e.g., shifted to avoid the failed column circuits and/or shifted onto reserve column circuits 40R).

Flag bits for each column line 45 (e.g., flag bits of the type shown in FIG. 4) may indicate which of transistors 48 and 50 on a given column line is to be used in reading out image signals. As examples, transistors 48 on a first side of a failed column circuit and transistors 50 on an opposing side of a failed column circuit may be enabled when reading out image signals or transistors 48 may be used for each column unless a flag bit for that column is set to a value of one.

Column randomizing circuitry such as CRM circuitry 28 of FIG. 7 may provide an image sensor with the capability of utilizing reserve column circuits while preserving the capability of column-wise randomization of image signal data.

Figure 8:
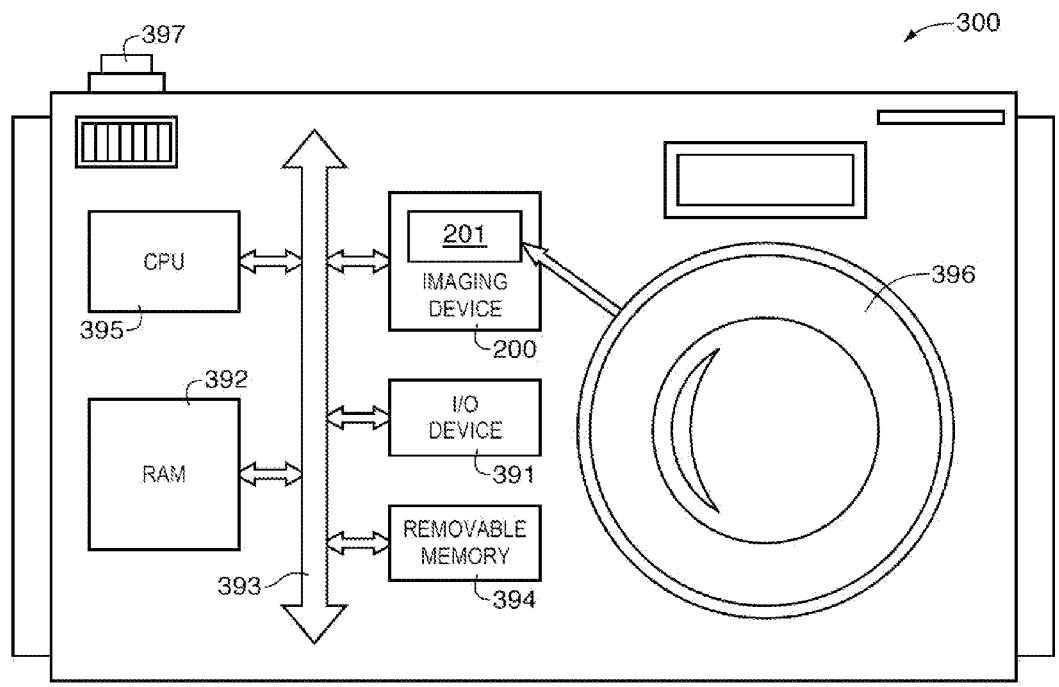
FIG. 8 is a block diagram of an imager employing the embodiments of FIGS. 1-7 in accordance with an embodiment of the present invention.

FIG. 8 shows in simplified form a typical processor system 300, such as a digital camera, which includes an imaging device 200. Imaging device 200 may include a pixel array 201 of the type shown in FIG. 2 that is coupled to column randomizing circuitry and column control and readout circuitry having reserve column circuits. Processor system 300 is exemplary of a system having digital circuits that may include imaging device 200. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating image sensors having one or more image pixel arrays each with image pixels arranged in pixel rows and pixel columns. Each pixel column of an image pixel array may be coupled to column circuitry for reading out image signals from the pixel column. Column randomizing circuitry may distribute the image signals from image pixels in each pixel column to various column circuits in the column readout circuitry to reduce fixed pattern noise in captured images.

The column readout circuitry may include at least one column circuit for each pixel column and at least one reserve column circuit. In the event that one of the column circuits fails, one or more reserve column circuits may be used for reading out image signals from the pixel columns.

Sets of N pixel columns may be selectively connected to sets of M column circuits through column randomizing circuitry with multiple parallel gates on each column. The M column circuits may be a number of column circuits that is greater than the number N pixel columns in a set of pixel columns. The sets of column circuits may be partially overlapping sets of column circuits in which a particular column circuit may be operable to readout image pixels from pixel columns in multiple sets of pixel columns depending on whether any column circuits have failed.

If it is determined that any pixel column in the pixel array exhibits poor column performance (e.g., that the column circuitry for that pixel column has failed), programming equipment or other circuitry on the image sensor may be used to set column failure flag bits that are used by the column randomizing circuitry to redistribute image signals around the failed column circuit.

The foregoing is merely illustrative of the principles of this invention which can be practiced in other embodiments.

What is claimed is:

1. An image sensor, comprising:
    an array of image pixels arranged in pixel columns;
    column randomizing circuitry; and
    column readout circuitry having a plurality of column circuits, wherein there are more of the column circuits than the pixel columns, wherein the column readout circuitry is coupled to the array of image pixels through the column randomizing circuitry, wherein at least two switches in the column readout circuitry are coupled between each pixel column and a given one of the plurality of column circuits, and wherein at most one of the at least two switches in the column readout circuitry is enabled during operation of the image sensor.

2. The image sensor defined in claim 1 wherein the column circuits comprise at least one column circuit associated with each pixel column and at least one reserve column circuit.

3. The image sensor defined in claim 2 wherein the at least one reserve column circuit comprises at least three reserve column circuits.

4. The image sensor defined in claim 2 wherein the column randomizing circuitry is configured to distribute image signals from at least one pixel column to the at least one reserve column circuit.

5. The image sensor defined in claim 4 wherein the column randomizing circuitry is configured to distribute image signals from at least one pixel column to the at least one reserve column circuit when any of the column circuits associated with the pixel columns has failed.

6. The image sensor defined in claim 5 wherein the column randomizing circuitry is further configured to randomize the distribution of image signals from the at least one pixel column to the column readout circuitry.

7. The image sensor defined in claim 6 wherein the column randomizing circuitry includes an output column line for each column circuit, and wherein the at least two switches comprise first and second transistors coupled in parallel to each output column line.

8. The image sensor defined in claim 7 wherein the first transistor on a given output column line is operable to transfer the image signals to the output column line when the column circuits associated with each pixel column are operational.

9. The image sensor defined in claim 8 wherein the second transistor on a given output column line is operable to transfer the image signals to the output column line when at least one of the column circuits has failed.

10. The image sensor defined in claim 6 wherein the column randomizing circuitry is configured to distribute image signals from a given pixel column among a first set of column circuits when the column circuits associated with each pixel column are operational.

11. The image sensor defined in claim 10 wherein the column randomizing circuitry is configured to distribute the image signals from the given pixel column among a second set of column circuits when any of the column circuits associated with the pixel columns has failed.

12. The image sensor defined in claim 11 wherein the second set of column circuits is shifted with respect to the first set of column circuits.

13. The image sensor defined in claim 11 wherein the second set of column circuits partially overlaps the first set of column circuits.

14. The image sensor defined in claim 11 wherein the first set of column circuits includes a failed column circuit.

15. An electronic device, comprising:
    a lens; and
    an image sensor comprising an array of image pixels arranged in a number of pixel columns, column randomizing circuitry, and column control and readout circuitry having a number of column circuits that is equal to the number of pixel columns and an additional reserve column circuit, wherein the column readout circuitry is coupled to the array of image pixels through the column randomizing circuitry, wherein the column randomizing circuitry is configured to distribute image signals from image pixels in each pixel column to column circuits in the column control and readout circuitry, wherein image signals from the given pixel column are distributed among a respective first set of column circuits when the column circuits associated with the given pixel column are operational, wherein image signals from the given pixel column are distributed among a respective second set of column circuits when any of the column circuits associated with the given pixel column has failed, and wherein the second set of column circuits partially overlaps the first set of column circuits.

16. The electronic device defined in claim 15, further comprising:
    processing circuitry configured to receive image data from the image sensor.

17. The electronic device defined in claim 16 wherein the column randomizing circuitry is configured to distribute a first portion of the image signals from image pixels in a particular pixel column to a selected one of the column circuits and to distribute a second portion of the image signals from the image pixels in the particular pixel column to the additional reserve column circuit.

18. A system, comprising:
    a central processing unit;
    memory;
    input-output circuitry; and
    an imaging device, wherein the imaging device comprises:
        a lens;
        a plurality of image pixels arranged in a number of pixel columns;
        column readout circuitry having a number of column circuits that is greater than the number of pixel columns; and
        column randomized modulation circuitry interposed between the plurality of image pixels and the column readout circuitry, wherein the column randomized modulation circuitry routes signals from one of the pixel columns to a column line via one of a plurality of switches coupled in parallel between the given pixel column and the given column line.

19. The system defined in claim 18 wherein the column readout circuitry is configured to store a plurality of flag values associated with each column circuit.

20. The system defined in claim 19 wherein the plurality of flag values include flag values that indicate operational column circuits and flag values that indicate failed column circuits.

* * * * *